Patented Apr. 20, 1943

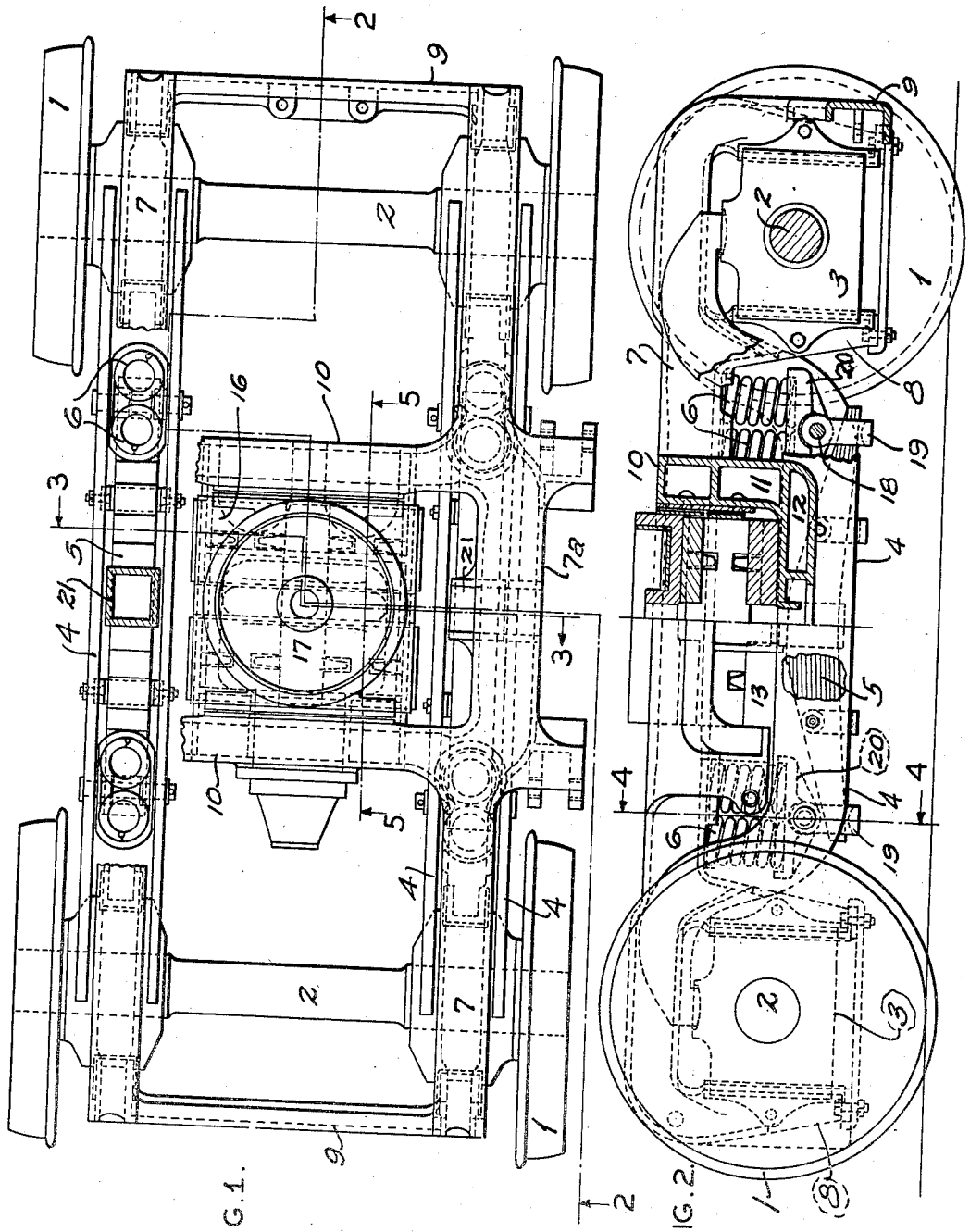

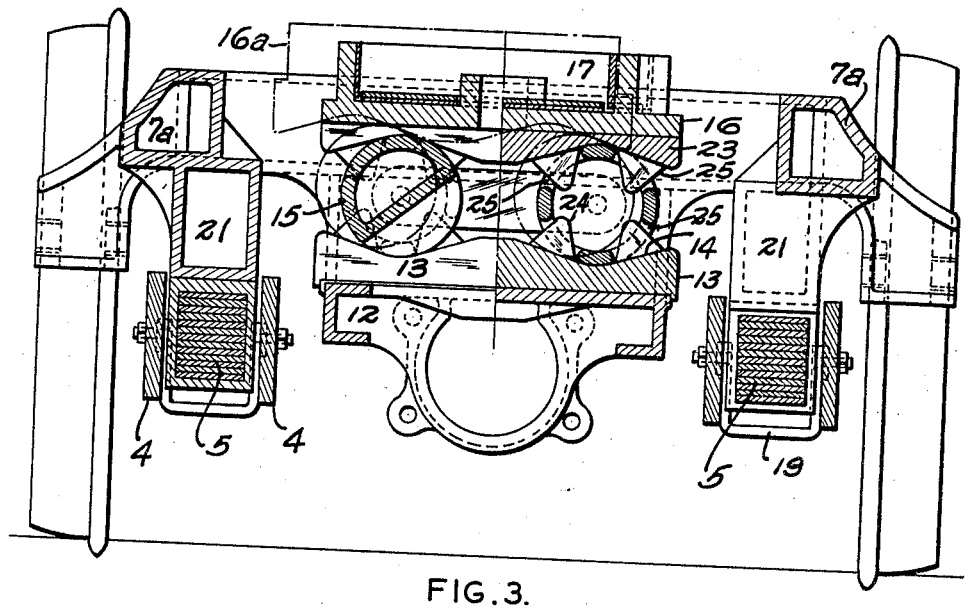

2,317,169

UNITED STATES PATENT OFFICE 2,317,169

RAILWAY TRUCK

Harry R. Bartell, University City, Mo., assignor to General Steel Castings Corporation, Granite City, Ill., a corporation of Delaware Application January 27, 1941, Serial No. 376,021

6 Claims. (Cl. 105—186)

The invention relates to railway rolling stock and more particularly to engine trucks of the type usually provided beneath the forward end of the locomotive in which the axle journals are "inside" the wheels to provide maximum clearance between the wheels and the steam cylinders.

The main object of the invention is to provide an easy riding truck with a stable bolster centering device which operates smoothly to maintain the desired relation between the truck frame and bolster.

The attainment of the above object requires that the spring support for the truck frame be coordinated with the centering device which receives the truck load and transfers it to the truck frame, because the shifting of the point of support of the load from the center of the truck towards the side of the truck, as the car body and truck accommodate relative lateral thrusts, results in a heavier than normal load on the spring structure at one side of the truck and a lighter than normal load on the spring structure at the opposite side of the truck.

Hence it is an object of the invention to provide spring supports at the sides of the truck which yield readily to produce easy spring action when ordinary vertical forces are applied while the bolster is centered and which also provides adequate additional spring support at one side of the truck when substantially heavier forces are applied to the springs at that side of the truck as when the bolster is moved from the truck center towards that side of the truck.

Another object of the invention is to provide adequate spring support as just described without requiring unduly heavy leaf springs and without subjecting the truck frame to undesirable movement due to the oscillating tendency of coil springs.

These and other detailed objects of the invention as will appear from the following description are attained by the structure illustrated in the accompanying drawings in which—

Figure 1 is a top view of a 4-wheel engine truck with part of the transoms and one wheel piece of the truck frame being broken away to more clearly illustrate the parts beneath the same.

Figure 2 is in part a side elevation and in part a vertical longitudinal section and is taken approximately on the line 2—2 of Figure 1.

Figure 3 is a vertical transverse section through the truck taken on the line 3—3 of Figure 1.

Figure 4 is a detailed longitudinal vertical section taken on the line 4—4 of Figure 2.

Figure 5 is a detailed longitudinal vertical section taken on the line 5—5 of Figure 1.

The truck includes the usual wheels 1, axles 2, and journal boxes 3. A pair of spaced drop or depressed equalizer bars 4 extend between journal boxes 3 at each side of the truck, and the truck springs 5 and 6 are supported on and between the equalizers of each pair and mount the truck frame which includes wheel pieces 7 having depending pedestal legs 8 for receiving the journal boxes, the wheel pieces being connected by end rails 9 and transverse transoms 10.

Each transom 10 intermediate the wheel pieces has a depending portion 11 and these portions 11 are connected by a suitable tie 12. Preferably wheel pieces 7, pedestal legs 8, end rails 9, transoms 10, portions 11 and tie 12 comprise a one piece casting although this integral structure is not essential to the present invention.

Renewable bearings 13 are carried upon tie 12 and are spaced apart longitudinally of the truck and each includes spaced apart shallow V-shaped tracks 14. A pair of rollers 15 are mounted on tracks 14 and support the truck bolster 16 which includes the circular center plate 17 which receives the truck load from the superstructure.

The load on bolster 16 is transmitted through rollers 15 to frame transoms 10 and through the latter to wheel pieces 7 and thence through the springs 5 and 6 to equalizing bars 4.

Horizontal pins 18 are seated in bars 4 near the ends of the lower portions of the latter, and each pin pivotally supports a yoke-like spring mounting member 19 and a cup-like spring seat 20, the latter having a central depending boss 20a received between the upright legs 19a of the yoke.

Coil springs 6 are arranged in groups of two but it will be understood that a single coil or three or more coils could be used in each unit if desired. These coil springs have their upper ends received in spring caps 22 provided on the end portions of wheel pieces 7 directly above the longitudinal center line of the equalizing bar structure. The intermediate portion 7a of each wheel piece is offset outwardly of the truck to accommodate the lateral movement of bolster 16 and is provided with a downwardly and inwardly extending saddle 21 resting upon the intermediate portion of leaf spring 5, the ends of which are carried on yokes 19.

It has been the practice on four-wheel engine trucks to use only a semi-elliptic spring on each side of the truck between the equalizers and the truck frame, but the present arrangement gives a better spring support because the load can be distributed on both types of springs, thus making it possible to have a more flexible and lighter semi-elliptic spring. A lighter semi-elliptic spring will tend to reduce spring breakage and eliminate the hard riding of a heavier spring. The combination of semi-elliptic and coil springs will also tend to eliminate synchonization of vibrations resulting from spring oscillations. The spacing of the coil springs a considerable distance from the transverse center line of the truck also tends to eliminate tipping of the truck frame in a longitudinal direction.

Yokes 19 and seats 20 are free to pivot independently of each other on pins 18, thus avoiding any restraint on the action of one spring by the action of one of the other springs.

The bolster bearings 23 for rollers 15 are renewable like seats 13 and like the latter have shallow V-shaped tracks for the rollers. Bearings 13 and 23 are each provided with teeth 24 and 25 respectively which are received in apertures 26 in rollers 15 to keep the bearings and rollers in proper relation with each other at all times.

Each roller 15 comprises cylindrical end portions and a semi-cylindrical center portion and extends longitudinally of the truck between transoms 10. The ends of the rollers are provided with spacers 27 and the corresponding sides of the transoms are provided with suitable wear plates 28, and similar wear plates 29 are provided on the transom-opposing faces of bolster 16. This arrangement results in a wide stable support of the bolster and when the latter moves laterally of the truck, as indicated by the broken line position 16a in Figure 3, the inclined tracks cause the bolster to rise and produces a returning or centering reaction when the force tending to move the bolster laterally is terminated.

The diameter of the rollers is approximately equal to the cam surface radius of the ordinary rocker so as to provide a comparatively large roller which has a larger contact area and a lesser amount wear than the trunnions of rockers. Due to their rolling action, the rollers also provide a lesser amount of overload when they are returned to their central position as compared to rockers. When rockers are returned to their central position, one of the trunnions drops back into its seat with a sudden jar which produces an overload and the transmission of undesirable shocks between truck and vehicle body as well as considerable wear between the trunnion and its seat.

It has been the general practice in engine trucks to provide rockers on the truck frame for supporting the bolster, each rocker having spaced trunnions seated on the truck frame and having an arcuate top surface engaging the bolster. When such rockers are used, the trunnions remain in fixed relation with the frame during relative lateral movement of the frame and bolster and when the relative lateral movement is a considerable amount, as is necessary on the larger locomotives, the center plate load comes very nearly in vertical alignment with the rocker trunnion and its bearing on the truck frame on the side of the truck toward which the bolster moves. This applies almost the full center plate load to the springs on the side of the truck toward which the bolster moves and relieves the springs on the other side of the truck of their load. This condition could be improved if it were possible to increase the transverse spacing of the rockers on the truck but there is a limit to the amount at which the rockers can be spaced transversely because engine trucks are usually provided with inside bearings so as to give better clearance between the truck frame and the steam cylinders of the locomotive.

Providing rollers between the truck frame and bolster instead of rockers reduces the tendency of applying the center plate load to one side of the truck when the bolster has moved a considerable amount laterally. The reason for this is that the roller moves along both the inclined surfaces of the bearings on the frame and the bolster and the point of contact between the roller and the bearing on the frame moves outwardly one-half the distance that the bolster moves laterally. Also, the point of contact between the roller and the bearing on the bolster moves toward the center plate one-half the amount of movement of the bolster laterally. As a result the center plate load is located intermediate the points of support between the bolster and roller and between the roller and truck frame a considerably greater distance inwardly than it would be located in a rocker arrangement providing for the same amount of lateral movement; hence there is a better distribution of weight on the springs at opposite sides of the truck and on the journal boxes and wheels on opposite sides of the truck than in trucks having rocker centering devices.

By using this roller arrangement instead of the usual rockers the springs at the sides of the truck can be designed to provide a softer action because there is much less difference between the normal load on the spring and the maximum load which is applied at maximum lateral movement of the bolster. The normal load is the same when either rockers or rollers are used, but the maximum load will be much less when rollers are used than when rockers are used because of the better distribution of the weight on the springs at opposite sides of the truck as mentioned above. The combination of coil and leaf springs to transmit the load of the wheel pieces also contributes to safer riding conditions to keep the wheels on the rails as there is a better distribution of the weight on the wheels due to the fact that the frame cannot tip an undesirable amount in a vertical longitudinal plane to throw too much of the load on one of the wheels on the same side of the truck.

The combination of the spring and roller bearing features in an engine truck gives better riding conditions than previous trucks and reduces the maintenance cost. There is less breakage of springs and less wear on the roller centering device. A roller centering device gives less wear than a rocker centering device because there are inclined surfaces above and below the rollers and the angle of incline is only one-half that required for a rocker centering device which has its inclined surfaces above the rocker only, and also because there is a rolling friction between roller and bearings instead of a sliding friction, such as between the comparatively small trunnions and bearings of a rocker centering device.

The details of the construction may be varied without departing from the spirit of the novel combination of features, and the exclusive use of such modifications of the invention as come within the scope of the claims is contemplated.

What is claimed is:

1. In a railway truck, spaced wheeled axles with journal boxes, an equalizing bar structure extending between the boxes on the same side of the truck, a truck frame having wheel pieces and transverse transoms extending between said wheel pieces, a truck bolster between said transoms, rollers carried by said transoms and supporting said bolster for movement of the latter transversely of the truck, upright coil springs on said bar structures at points spaced longitudinally of the truck and supporting said wheel pieces, and leaf springs extending longitudinally of the truck between said coil springs and carried by said bar structures and supporting said wheel pieces at points abreast of said bolster, the intermediate portion of each wheel piece being offset outwardly of the truck from its end portions to accommodate transverse movement of the bolster, and a bracket extending downwardly and inwardly from the offset portion of the wheel piece to clear the bolster, when the latter is moved towards that side of the truck, and resting upon the leaf spring over the longitudinal center line of the bar structure.

2. A truck as described in claim 1 in which the elements of the transoms and bolster engaged by the rollers are inclined upwardly and downwardly respectively from the points of contact when the bolster is in its normal position whereby said elements and rollers lift the portion of the bolster, nearest the wheel piece towards which it moves, on said rollers, to clear the corresponding bracket, and said elements and rollers act as a centering device for the truck.

3. In a railway truck, spaced wheeled axles with journal boxes, spaced equalizing bars extending between said boxes on the same side of the truck, a leaf spring extending longitudinally of the truck between said bars, pins extending transversely through said equalizing bars near the ends of said leaf spring, a hanger suspended from each of said pins and supporting the adjacent end of said leaf spring, a cup-like spring seat member having a downward projection overlapping the upper end of said hanger pivotally mounted on said pin independently of said hanger, upright coil springs on said seat elements, and a truck frame supported on all of said springs.

4. In combination in a railway truck, spaced wheeled axles with journal boxes, an equalizing bar structure extending between said boxes on the same side of the truck, springs disposed along said bar structure, a truck frame carried on said springs and including wheel pieces and transverse transoms, a truck bolster between said transoms, means supporting said bolster on said transoms at the same level as said wheel pieces and providing for movement of the bolster transversely of the truck, the portions of said wheel pieces alongside of said bolster being offset outwardly of the truck to accommodate said movement, there being brackets extending inwardly and downwardly from said offset portions and resting on the adjacent springs directly above the longitudinal center line of said bar structure and at the level of the adjacent portion of said bar structure.

5. A structure as described in claim 4 in which each truck frame wheel piece is of box-shaped cross section and the brackets extending therefrom are also of box-shaped cross section with the bottom wall of the wheel piece being extended to form the top wall of the bracket and the upright walls of the wheel piece and bracket being offset transversely of the truck.

6. In a railway truck, spaced wheeled axles with journal boxes mounted thereon inwardly of the wheels, an equalizing bar structure extending between the boxes on the same side of the truck and in the same general longitudinal vertical plane as the boxes, a truck frame having wheel pieces above said equalizing bar structures and having transoms extending transversely of the truck between the wheel pieces, a truck bolster between said transoms, rollers carried by said transoms and supporting said bolster for movement of the latter transversely of the truck, upright coil springs on each of the bar structures and spaced longitudinally of the truck from the bolster and supporting the corresponding wheel piece, a leaf spring extending longitudinally of the truck with its ends supported by the corresponding equalizing bar structure at points adjacent the coil springs, the portion of the wheel piece above the intermediate portion of the leaf spring being offset outwardly of the truck from the leaf spring to accommodate lateral movement of the bolster, and means supporting said wheel piece portion from the intermediate portion of said leaf spring.

H. R. BARTELL.